(12) United States Patent
Utermoehlen et al.

(10) Patent No.: US 11,604,257 B2
(45) Date of Patent: Mar. 14, 2023

(54) LIDAR DEVICE FOR OPTICALLY DETECTING A FIELD OF VIEW

(71) Applicant: Robert Bosch GmbH, Stuttgart (DE)

(72) Inventors: Fabian Utermoehlen, Lippstadt (DE); Jan Sparbert, Rutesheim (DE); Remigius Has, Grafenau-Daetzingen (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 507 days.

(21) Appl. No.: 16/640,091

(22) PCT Filed: Aug. 3, 2018

(86) PCT No.: PCT/EP2018/071113
§ 371 (c)(1),
(2) Date: Apr. 6, 2020

(87) PCT Pub. No.: WO2019/038061
PCT Pub. Date: Feb. 28, 2019

(65) Prior Publication Data
US 2020/0292708 A1    Sep. 17, 2020

(30) Foreign Application Priority Data
Aug. 23, 2017   (DE) .................... 10 2017 214 702.4

(51) Int. Cl.
*H02P 29/02* (2016.01)
*G01S 7/481* (2006.01)
*H02P 29/024* (2016.01)

(52) U.S. Cl.
CPC .......... *G01S 7/4814* (2013.01); *H02P 29/027* (2013.01)

(58) Field of Classification Search
CPC ............................ H02P 29/027; G01S 7/4814
See application file for complete search history.

(56) References Cited

U.S. PATENT DOCUMENTS 6,359,681 B1 * 3/2002 Housand ................ G02B 23/00
                                                250/342
6,366,345 B1    4/2002 Yamabuchi
                        (Continued)

FOREIGN PATENT DOCUMENTS

DE        10114362        10/2002
DE        10114362 A1 * 10/2002 ............. G01S 17/42
                        (Continued)

OTHER PUBLICATIONS

International Search Report dated Oct. 29, 2018 for corresponding International Application PCT/EP2018/071113 filed Aug. 3, 2018.

*Primary Examiner* — Thai T Dinh
(74) *Attorney, Agent, or Firm* — Norton Rose Fulbright US LLP; Gerard Messina

(57) ABSTRACT

A LIDAR device for optically detecting a field of view. The LIDAR device includes: a control unit for emitting at least one control signal; an electric motor, which has a motor current and is controllably rotatable about a rotational axis with the aid of the at least one control signal, and on which a switchable light source emitting light radiation is situated. The LIDAR device also includes at least one switch for suppressing the emission of the light radiation depending on a behavior of a current variable representing the motor current.

14 Claims, 4 Drawing Sheets

(56) References Cited

U.S. PATENT DOCUMENTS

| | | | | |
|---|---|---|---|---|
| 9,983,590 B2* | 5/2018 | Templeton | ............ | G01S 17/931 |
| 2016/0120405 A1* | 5/2016 | Tokuda | ................. | A61B 3/117 |
| | | | | 351/208 |
| 2016/0274589 A1* | 9/2016 | Templeton | ............ | G05D 1/024 |
| 2016/0291158 A1 | 10/2016 | Tang | | |

FOREIGN PATENT DOCUMENTS

| | | | | |
|---|---|---|---|---|
| DE | 102017214702 A1 * | 2/2019 | ........... | G01S 17/931 |
| DE | 102018214182 A1 * | 2/2020 | ............. | G01S 17/42 |
| EP | 2388615 | 11/2011 | | |

* cited by examiner

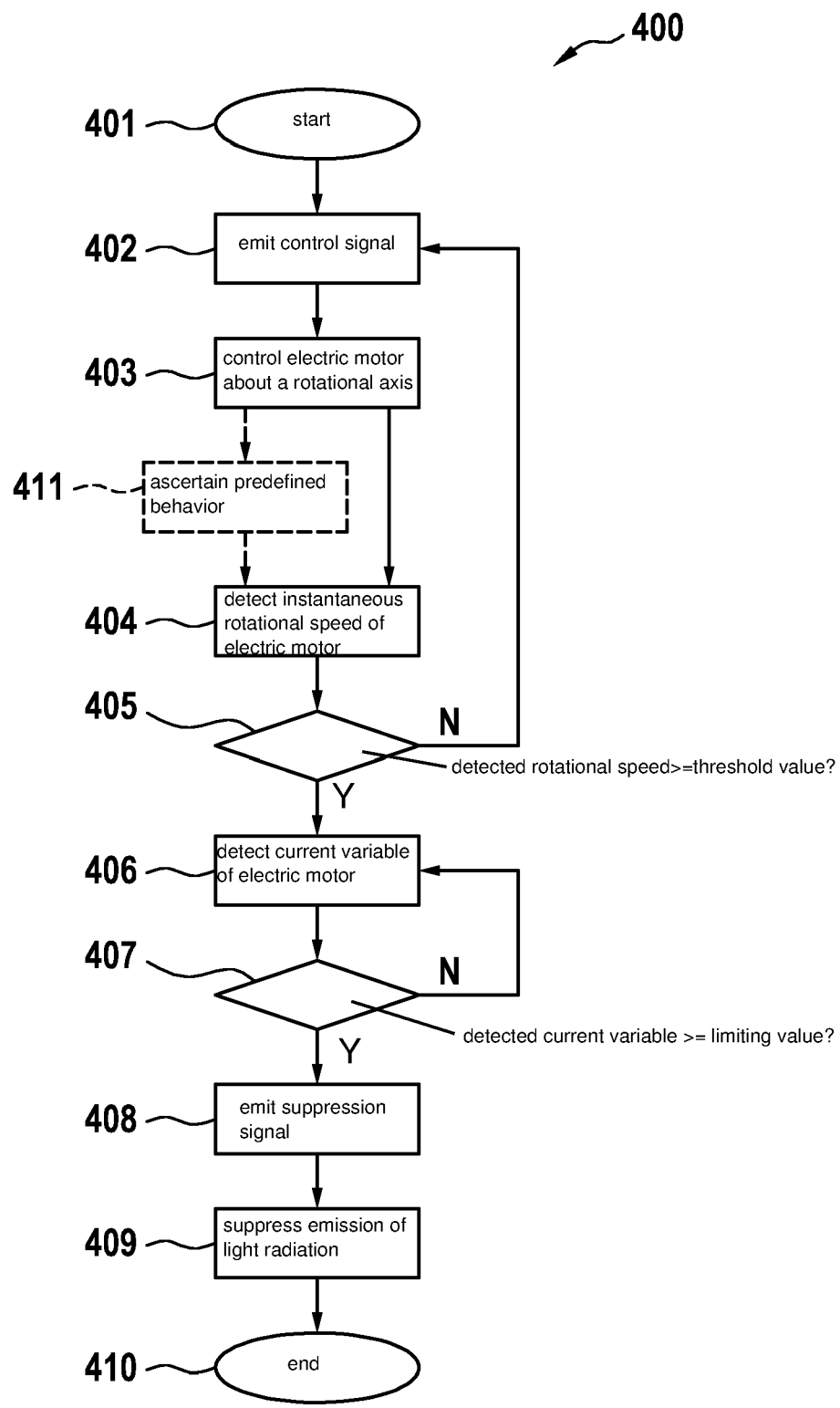

LIDAR DEVICE FOR OPTICALLY DETECTING A FIELD OF VIEW

FIELD

The present invention relates to a LIDAR device for optically detecting a field of view, a working device, and a method for activating a LIDAR device.

BACKGROUND INFORMATION

LIDAR (Light Detection and Ranging) systems are described in the related art, in which the necessary optical elements as well as the laser and the detector are fitted on a rotor. For example, European Patent No. EP 2388615 describes a LIDAR-based, 3D point cloud measuring system including a base, a housing, and a plurality of photon transmitters and photon detectors in the housing. A rotary motor rotates the housing about the base, a communication component permitting the transmission of signals of the photon detectors to external components. In order to ensure eye safety, a control component may also be present, which suppresses the photon transmitters from transmitting photons before a desired, minimum rotational speed has been reached.

BACKGROUND INFORMATION

The present invention is directed to a LIDAR device for optically detecting a field of view. An example LIDAR device in accordance with the present invention includes a control unit for emitting at least one control signal and an electric motor having a motor current. The electric motor is controllably rotatable about a rotational axis with the aid of the at least one control signal. A switchable light source emitting light radiation is situated on the electric motor.

According to the present invention, the example LIDAR device also includes at least one switching means for suppressing the emission of the light radiation depending on a behavior of a current variable representing the motor current.

The electric motor may include a stator, which is connected to a rotor via a rotational axis. The stator is the stationary, magnetically acting part of the electric motor. The rotor is the rotating, magnetically acting part of the electric motor. The electric motor may be designed as an external rotor, in which the stator is located on the inside and the rotor is located on the outside. The electric motor may be designed as an internal rotor, in which the stator is located on the outside and the rotor is located on the inside. The electric motor may be a brushless DC motor. The light source may be situated, in particular, on the rotor of the electric motor.

The rotary motion of the electric motor is effectuated by attractive forces and repulsive forces, which apply multiple magnetic fields onto one another. For this purpose, for example, the rotor may include permanent magnets and the stator may include electric coils. Alternatively, both the rotor as well as the stator may include electric coils. In particular, at least three electric coils may be situated at the stator. If a current flows through each of the electric coils, the electric coils generate a magnetic field, whose orientation depends on the current direction. With the aid of a predefined polarity reversal of the coils, the rotation of the rotor is started and, finally, a continuous rotation is achieved. This may be implemented, for example, via the current supply to the electric coils of the stator with the aid of a commutator. The control unit of the LIDAR device may be designed for acting as a commutator.

The electric motor may be implemented having sensor-controlled commutation. For this purpose, the position of the rotor may be detected with the aid of optical sensors or Hall sensors. The current supply to the electric coils may be activated according to the detected position of the rotor. The phases of the coils may be activated according to the detected position of the rotor.

The electric motor may be implemented having sensorless commutation. In an electric motor including at least three electric coils at the stator, only two electric coils are always activated in the normal case. Therefore, as soon as the rotor rotates, the position of the rotor may be detected via the determination of the induced voltage in an electric coil, which has not been activated. The current supply to the electric coils may be activated according to the detected position of the rotor. The phases of the coils may be activated according to the detected position of the rotor.

The light source of the LIDAR device may be a laser. The light source of the LIDAR device may be pulsed. In particular, the light source may be a pulsed laser. With the aid of the pulsed light source, light radiation may be emitted and, with the aid of the LIDAR device, the reflection of the light radiation may be detected. As a result, an image of the field of view may be recorded and, in the case of a pulsed light source, a distance measurement may be implemented.

A switching means (switch) for switching the switchable light source may be transferable into one of at least two possible switching states.

The advantage of the present invention is that the eye safety of the LIDAR device may be ensured. For example, in the case of a jamming of the electric motor, the rotation of the rotor about the rotational axis would be suppressed. In such a case, the pulsed light source would also no longer be moved. The light radiation would be emitted only along one spatial direction. The power of the emitted light radiation along this spatial direction would therefore exceed, for example, a limiting value, at which damage to an eye may occur. Multiple light pulses could impact the eye within a short time. Due to the suppression of the emission of the light radiation, according to the present invention, depending on a behavior of a current variable representing the motor current, it may now be ensured that multiple pulses of the light radiation do not impact an eye of a person in the surroundings of the LIDAR device within a short time.

In one advantageous embodiment of the present invention, it is provided that the LIDAR device continues to include at least one current sensor for detecting the behavior of the current variable representing the motor current, and a unit for comparing the behavior of the current variable representing the motor current to a predefined behavior. The control unit is also designed for emitting a suppression signal to the at least one switching means depending on the comparison.

The predefinable behavior in this case is a predefinable behavior of the current variable representing the motor current. The predefinable behavior may be a limiting value. During a continuous rotation of the rotor, the current variable representing the motor current may be constant. This may be understood to mean that, during a continuous rotation of the rotor, a very low or hardly any motor current is detectable. The detected current variable representing the motor current may have a low absolute value in this case. The detected current variable representing the motor current may be nearly zero in this case. If a jamming of the electric motor occurs, the current variable representing the motor current may increase. The increase of the current variable representing the motor current may be very rapid within a short time. If a jamming of the electric motor occurs, a comparison of the behavior of the current variable representing the motor current to a predefinable behavior may yield the result that the current variable representing the motor current exceeds a limiting value.

An advantage of this example embodiment is that the behavior of the current variable representing the motor current is detectable with the aid of few additional components of the LIDAR device. The LIDAR device is therefore kept simple and cost-effective. With the aid of the current sensor, the behavior of the current variable representing the motor current may be quickly detected. As a result, the suppression of the emission of the light radiation may take place quickly.

The predefinable behavior of the current variable representing the motor current may be stored in the control unit. The limiting value may be stored as a constant in the control unit.

In one further advantageous embodiment of the present invention, it is provided that the control unit is also designed for ascertaining the predefinable behavior of the current variable representing the motor current. For this purpose, the control unit may detect and store the profile of the behavior of the current variable representing the motor current across multiple rotations of the rotor. The control unit may detect and store the profile of the phase currents across multiple rotations of the rotor. The setpoint profile of the behavior of the current variable representing the motor current identified as the norm may be stored as a predefinable behavior.

An advantage of this embodiment is that the predefinable behavior of the current variable representing the motor current may be substantially more precisely defined for the LIDAR device. As a result, the suppression of the emission of the light radiation may take place very quickly.

In one further advantageous embodiment of the present invention, it is provided that the at least one current sensor is designed as a measuring shunt, in particular as a low-resistance measuring shunt. A low-resistance measuring shunt may be, for example, a shunt resistor.

Alternatively to measuring the motor currents in the supply lines of the electric motor, the current may also be measured in the half-bridges of the inverter. For this purpose, it is advantageous to place a shunt resistor between the electrical ground and the source terminal of the lower field effect transistor. The lower field effect transistor is the one whose source terminal is normally connected directly to the ground of the DC voltage supply.

An advantage of this embodiment is that the detected behavior of the current variable representing the motor current may be converted directly into a digital signal. Depending on the comparison of the behavior of the current variable representing the motor current to a predefined behavior, the control unit may very rapidly emit a suppression signal to the switching means. Moreover, the dynamic range for the detection of the behavior of the current variable representing the motor current is considerably less. In addition, the current draw of the overall system may be detected.

In one further advantageous embodiment of the present invention, it is provided that the at least one current sensor is designed as a magnetic field sensor. A magnetic field sensor may be, for example, a Hall sensor, a GMR (giant magnetoresistance) sensor, or a TMR (tunnel magnetoresistance) sensor. The magnetic field sensor may indirectly permit an inference to be made regarding at least one phase current via the magnetic field caused by the current variable representing the motor current.

An advantage of this embodiment is that the measuring signal may be measured in a potential-free manner and that no modification of the electrical circuit is necessary.

In one further advantageous embodiment of the present invention, it is provided that the at least one switching means is designed for switching the connection of the light source to an energy supply. The switching means may be designed, for example, as a relay or as a transistor or as a functionally identical component. The switching means for switching the switchable light source may be transferable into one of at least two possible switching states. A first possible switching state may be designed in such a way that the light source is connected to the energy supply. The second possible switching state may be designed, in this case, in such a way that the connection of the light source to the energy supply is suppressed.

An advantage of this embodiment is that the suppression of the emission of the light radiation is very quickly implementable.

In one further advantageous embodiment of the present invention, it is provided that the at least one switching means is designed for switching a mechanical flap in the beam path of the light source. The switching means for switching the mechanical flap may be transferable into one of at least two possible switching states. A first possible switching state may be designed in such a way that the mechanical flap is open and the emission of the light radiation is made possible. The second possible switching state may be designed, in this case, in such a way that the mechanical flap is closed and the emission of the light radiation is suppressed.

An advantage of this embodiment is that the suppression of the emission of the light radiation is very quickly implementable.

In one embodiment of the present invention, the LIDAR device may also include at least two switching means for suppressing the emission of the light radiation. In this case, for example, one of the at least two switching means may be designed for switching the connection of the light source to an energy supply and a second of the at least two switching means may be designed for switching a mechanical flap in the beam path of the light source.

An advantage of this embodiment is that the suppression of the emission of the light radiation may be doubly secured as a result. The eye safety of the LIDAR devices may be considerably enhanced.

In one further advantageous embodiment of the present invention, it is provided that the LIDAR devices also include a unit for detecting an instantaneous rotational speed of the electric motor and a unit for comparing the instantaneous rotational speed to a threshold value. If the instantaneous rotational speed has reached and/or exceeded the threshold value, the start-up of the rotation of the rotor may be considered to have been concluded. The light source may be switched, in this case, in such a way that it emits light radiation only after the start-up of the rotation of the rotor. The behavior of the current variable representing the motor current is also detected only after the start-up of the rotation of the rotor.

An advantage of this embodiment is that the switching means of the light source may be activated in a targeted manner. In particular, the suppression of the emission of the light radiation may be controlled in a targeted manner.

According to the present invention, a working device and, in particular, a vehicle including an above-described LIDAR device, are also provided.

The present invention is also directed to a method for activating a LIDAR device. An example according to the present invention includes the steps: emitting at least one control signal with the aid of a control unit; and controlling an electric motor about a rotational axis with the aid of the at least one control signal, a switchable light source emitting light radiation being situated on the electric motor.

According to the present invention, the suppression of the emission of the light radiation depends on a behavior of a current variable representing the motor current.

In one embodiment of the method in accordance with the present invention, the behavior of the current variable representing the motor current is detected with the aid of at least one current sensor. The detected behavior of the current variable representing the motor current is compared to a predefinable behavior. In order to suppress the emission of the light radiation, at least one suppression signal is emitted to at least one switching means of the switchable light source depending on the comparison.

In one further embodiment of the method in accordance with the present invention, the predefinable behavior of the current variable representing the motor current is ascertained with the aid of the control unit.

In one further embodiment of the method in accordance with the present invention, the suppression of the emission of the light radiation occurs by transferring the at least one switching means for switching the switchable light source into one of at least two possible switching states.

In one further embodiment of the method in accordance with the present invention, an instantaneous rotational speed of the electric motor is detected and the instantaneous rotational speed is compared to a threshold value. The detection of the behavior of the current variable representing the motor current takes place, in this case, with the aid of a current sensor when the instantaneous rotational speed exceeds the threshold value.

BRIEF DESCRIPTION OF THE DRAWINGS

One exemplary embodiment of the present invention is explained in greater detail in the following with reference to the attached drawings. Identical reference numerals in the figures designate identical or identically acting elements.

FIG. 4 shows a flow chart of the method according to the present invention.

DETAILED DESCRIPTION OF EXAMPLE EMBODIMENTS

Figure 1:
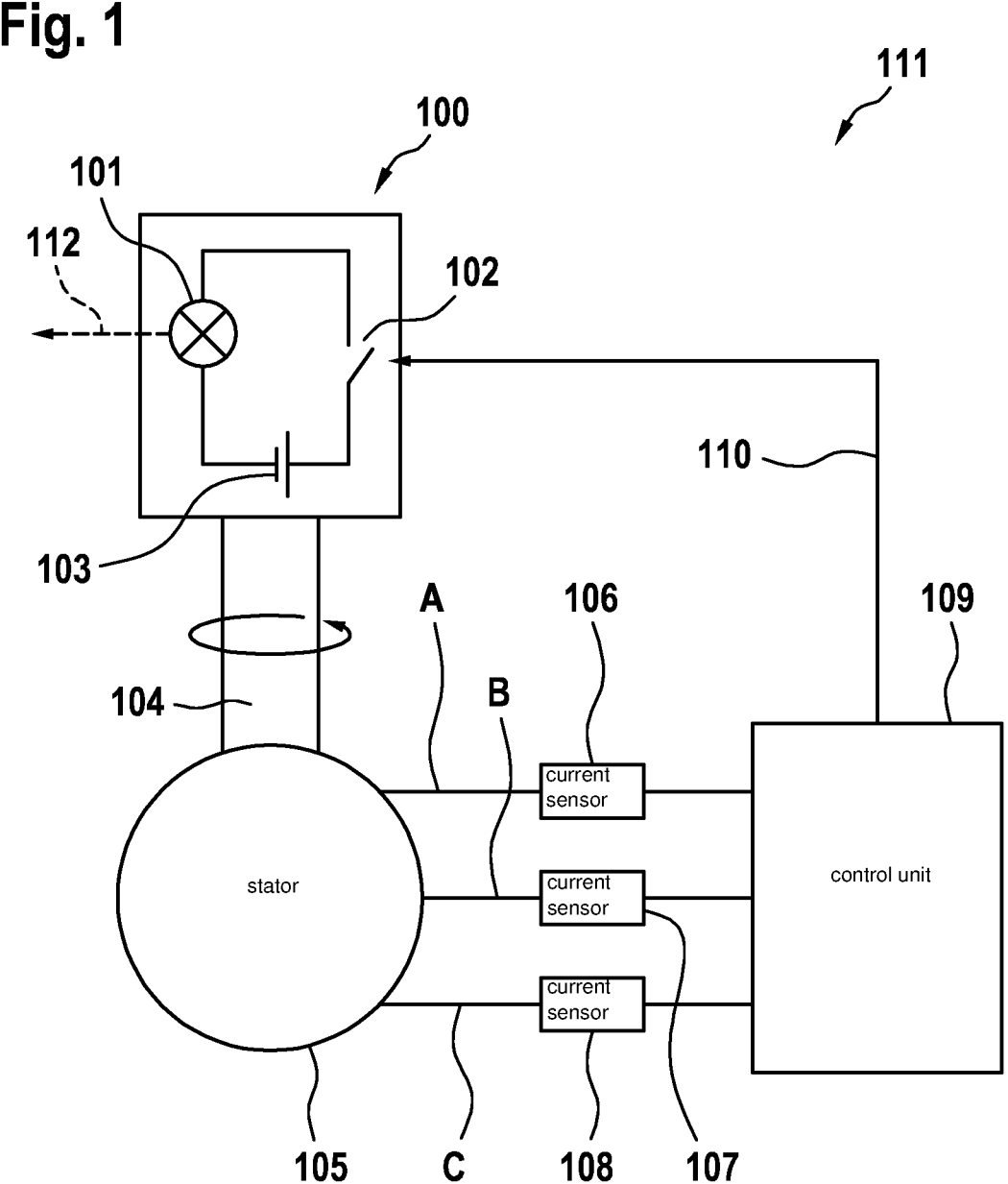
FIG. 1 shows a first embodiment of the LIDAR device according to the present invention.

FIG. 1 shows a LIDAR device 111. LIDAR device 111 includes an electric motor. The electric motor is made up of stator 105 and rotor 100. The electric motor may be, in particular, a brushless DC motor. The electric motor may be designed as an external rotor or as an internal rotor. The electric motor may be implemented having a sensor-controlled or sensorless commutation. Rotor 100 is rotatable about a rotational axis 104. The rotation/rotary motion of the electric motor is effectuated by attractive forces and repulsive forces, which apply multiple magnetic fields onto one another. For this purpose, either stator 105 or rotor 100, or both stator 105 as well as rotor 100 include electric coils. In particular, at least three electric coils may be situated at stator 105 and/or at rotor 100. If a current flows through each of the electric coils, the electric coils generate a magnetic field, whose orientation depends on the current direction. With the aid of a predefined polarity reversal of the coils, the rotation of rotor 100 is started and, finally, a continuous rotation is achieved. This may be implemented, for example, via the current supply to the electric coils of rotor 100 and/or of stator 105 with the aid of a commutator. For this purpose, control signals A, B, and C are transmitted to the electric motor. Control signals A, B, and C may also be referred to as so-called motor phases A, B, and C. In the present example, the commutator is the same as control unit 109. The electric motor may be implemented having a sensor-controlled or sensorless commutation.

Figure 3:
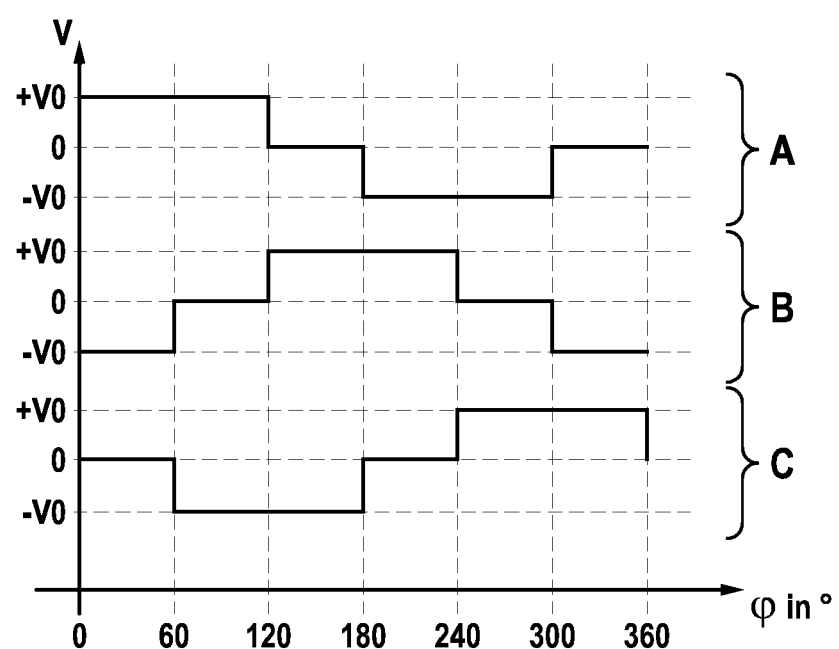
FIG. 3 shows a commutation pattern of the electric motor.

FIG. 3 shows a possible commutation pattern of the electric motor. It shows, in particular, the cycle pattern of motor phases A, B, and C during the start-up of the rotation of rotor 100. Depending on rotation angle φ of rotor 100, the motor phases are switched back and forth between a positive voltage V0, a negative voltage −V0, and a voltage of 0 V. Depending on the position of rotor 100, the motor phases are switched back and forth between a positive voltage V0, a negative voltage minus V0, and a voltage of 0 V. The cycle pattern is transmitted to the electric motor with the aid of control unit 109 (see FIG. 1).

As represented in FIG. 1, switchable light source 101 emitting light radiation 112 may be situated on the electric motor. Light source 101 is situated on rotor 100 in the example. In particular, light source 101 is situated on an area of rotor 100 spaced apart from stator 105. As a result, light source 101 is situated on rotor 100 in such a way that it may emit light radiation 112 into the field of view of LIDAR device 111. Light source 101 may be a laser. Light source 101 may be pulsed. In particular, light source 101 may be a pulsed laser. Light source 101 is switchable with the aid of switching means 102. Switching means 102 is designed, in the example, for switching the connection of light source 101 to energy supply 103 of light source 101. Switching means 102 may be a relay, a transistor, or a functionally identical component. Switching means 102 may be transferable into one of at least two possible switching states.

A first possible switching state may be designed in such a way that light source 101 is connected to energy supply 103. The second possible switching state may be designed, in this case, in such a way that the connection of light source 101 to energy supply 103 is suppressed. Control unit 109 of LIDAR device 111 may emit a signal 110 to switching means 102 for this purpose. Emitted signal 110 may effectuate a connection of light source 101 to energy supply 103. In this case, switching means 102 in FIG. 1 would be closed. In this case, light source 101 may emit light radiation 112. Alternatively, emitted signal 110 may effectuate a suppression of the connection of light source 101 to energy supply 103 (represented in FIG. 1 as open switching means 102). In this second case, light source 101 may emit no light radiation 112 into the field of view of the LIDAR device.

In particular, signal 110, which effectuates a connection of light source 101 to energy supply 103, is emitted only once the rotation of rotor 100 has started and a continuous rotation has been reached. In order to ensure this, an instantaneous rotational speed of the electric motor may be detected with the aid of control unit 109. The detected rotational speed is compared with a threshold value. If the detected rotational speed has reached and/or exceeded the threshold value, the start-up of the rotation of rotor 100 may be considered to have been concluded. Control unit 109 then emits signal 110, which effectuates a connection of light source 101 to energy supply 103. At this point in time, the behavior of a current variable representing the motor current is detected.

With the aid of current sensors 106, 107, and 108, the behavior of the current variable representing the motor current of the electric motor is detected. Current sensors 106, 107, and 108 may be designed as a measuring shunt. For example, current sensors 106, 107, and 108 may be shunt resistors. In this case, the current variable representing the motor current is a current, in particular a phase current of at least one of the electric coils in each case. Current sensors 106, 107, and 108 may detect a change of the flowing current, in particular at least of a phase current. Alternatively or additionally, current sensors 106, 107, and 108 may also be designed as magnetic field sensors. In this case, current sensors 106, 107, and 108 may detect changing magnetic fields. If a current flows through a magnetic field sensor, the magnetic field sensor may detect a voltage when brought into a magnetic field. In this case, the current variable representing the motor current is a voltage detected with the aid of the magnetic field sensor in each case. From the gathered data, inferences may be made regarding the particular phase current of at least one of the electric coils.

The detected behavior of the current variable representing the motor current is compared to a predefinable behavior of the current variable representing the motor current. This may take place, for example, in control unit 109. The predefinable behavior in this case is a predefinable behavior of the current variable representing the motor current. The predefinable behavior may be a limiting value. For example, during a continuous rotation of rotor 100, the current variable representing the motor current may be constant. During a continuous rotation of rotor 100, only a very low or hardly any motor current/phase current may be detectable. If a jamming of the electric motor now occurs, however, the current variable representing the motor current may rapidly increase. The comparison of the behavior of the current variable representing the motor current to the predefinable behavior may yield the result, for this case, that the current variable representing the motor current exceeds the limiting value.

The predefinable behavior of the current variable representing the motor current may be stored in control unit 109. The limiting value may be stored as a constant in control unit 109. Alternatively or additionally, the predefinable behavior of the current variable representing the motor current may be ascertained. For this purpose, control unit 109 may detect and store the profile of the behavior of the current variable representing the motor current across multiple rotations of rotor 100. Control unit 109 may detect and store the profile of the phase currents across multiple rotations of rotor 100. The setpoint profile of the behavior of the current variable representing the motor current identified as the norm may be stored as a predefinable behavior.

Control unit 109 is also designed for emitting a suppression signal 110 to switching means 102 depending on the comparison. Suppression signal 110 is emitted when the current variable representing the motor current exceeds the limiting value. In this case, suppression signal 110 effectuates the switching of switching means 102 into the switching state in which the connection of light source 101 to energy supply 103 is suppressed. Therefore, if there is a jamming of the electric motor, light source 101 of LIDAR device 111 may be suppressed from emitting light radiation 112.

Figure 2:
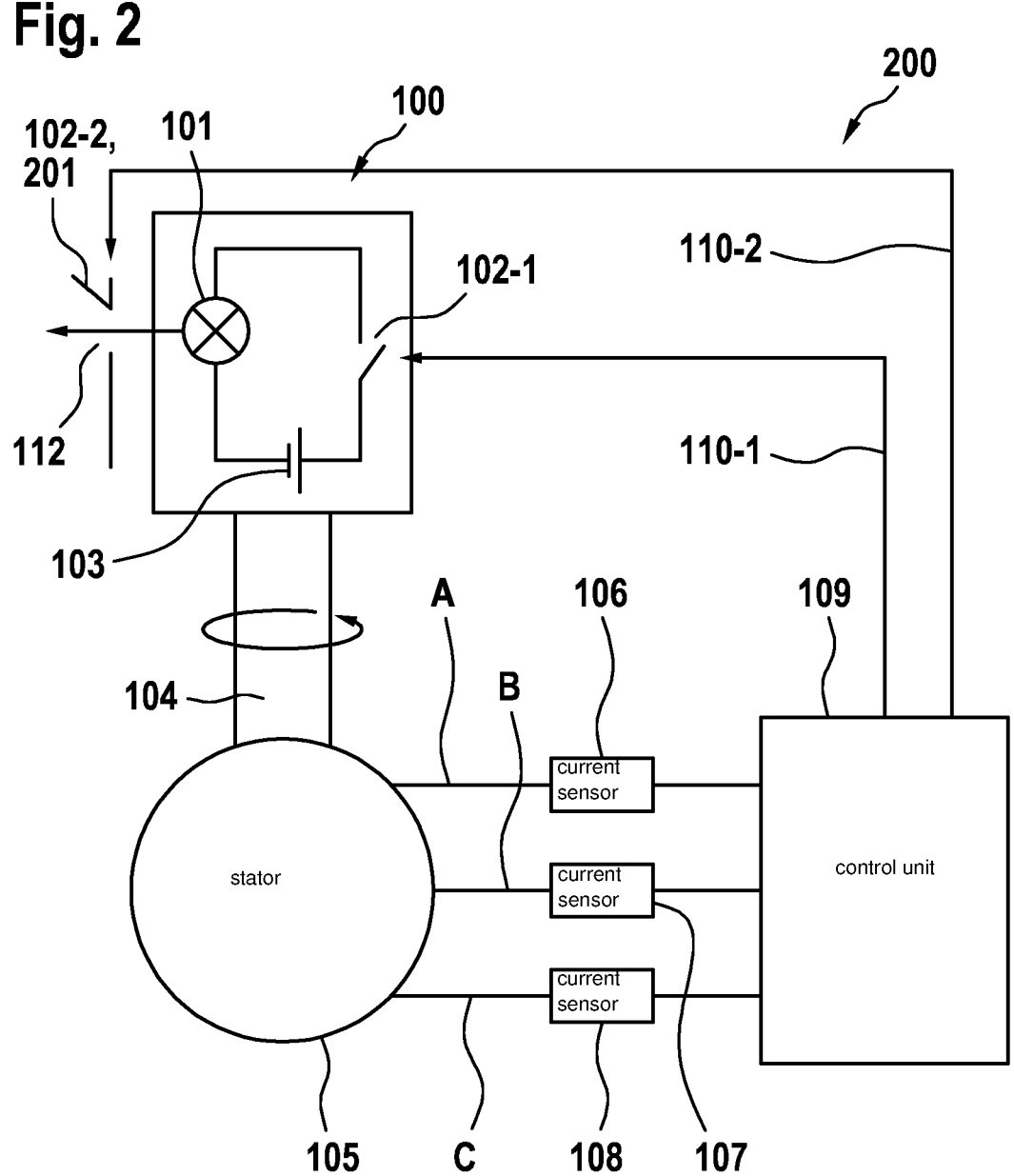
FIG. 2 shows a second embodiment of the LIDAR device according to the present invention.

FIG. 2 shows a second LIDAR device 200. LIDAR device 200 is a second embodiment. It is essentially identical to LIDAR device 111 from FIG. 1. Identical reference numerals in FIGS. 1 and 2 designate identical or identically acting elements. For a more detailed explanation, refer to the description with respect to FIG. 1.

LIDAR device 200 additionally includes a mechanical flap 201 at the outlet area of light radiation 112 out of light source 101. LIDAR device 200, similarly to LIDAR device 111 from FIG. 1, includes a first switching means 102-1 for switching the connection of light source 101 to energy supply 103. In order to control the switching states of first switching means 102-1, control unit 109 may emit a first signal 110-1 to switching means 102-1. Mechanical flap 201 is therefore a second switching means 102-2 of switchable light source 101. Similarly to first switching means 102-1, second switching means 102-2 may also be transferable into one of at least two possible switching states. A first possible switching state may be designed in such a way that mechanical flap 201 is open. In this case, light radiation 112 emitted from light source 101 may be emitted into the field of view of LIDAR device 200. The second possible switching state may be designed in such a way that mechanical flap 201 is closed. In this case, the emission of light radiation 112 into the field of view of LIDAR device 200 is suppressed. In order to control the switching states of second switching means 102-2, control unit 109 may emit a second signal 110-2 to switching means 102-2.

Similarly to LIDAR device 111, control unit 109 of LIDAR device 200 also emits, depending on the above-described comparison, a first suppression signal 110-1 to the first switching means and/or a second suppression signal 110-2 to second switching means 102-2. The at least one suppression signal 110-1, 110-2 is emitted when the current variable representing the motor current exceeds the limiting value. The at least one suppression signal 110-1, 110-2 then effectuates a switching of at least one of the switching means 102-1, 102-2 into a switching state, which suppresses light source 101 of LIDAR device 111 from emitting light radiation 112. Here, only one of the two switching means 102-1 or 102-2 may be appropriately switched in each case. Alternatively, both switching means 102-1 and 102-2 may also both be switched into the appropriate switching state.

FIG. 4 shows a flow chart of method 400 according to an example embodiment of the present invention. The method starts in step 401. In step 402, at least one control signal A, B, C is emitted with the aid of a control unit 109 of an above-described LIDAR device 111 or 200.

With the aid of the at least one control signal A, B, or C, in step 403, an electric motor is controlled about a rotational axis. A switchable light source 101 emitting light radiation 114 is situated on the electric motor, as described above.

In step 404, an instantaneous rotational speed of the electric motor is detected. The detected rotational speed of the electric motor is compared to a threshold value in step 405. A check is carried out to determine whether the detected rotational speed reaches and/or exceeds the threshold value. If this is not the case, step 402 is repeated. If the detected rotational speed reaches and/or exceeds the threshold value, the method is continued in step 406.

In step 406, the behavior of a current variable of the electric motor representing the motor current is detected. This takes place, as described above, with the aid of a current sensor 106, 107, 108.

In step 407, the detected behavior of the current variable representing the motor current is compared to a predefinable behavior. In the comparison, a check may be carried out to determine whether the detected behavior of the current variable representing the motor current reaches and/or exceeds a limiting value. If this is not the case, step 406 is repeated. If the detected behavior of the current variable representing the motor current reaches and/or exceeds the limiting value, the method is continued in step 408.

In step 408, at least one suppression signal 110, 110-1, 110-2 is emitted to at least one switching means 102, 102-1, 102-2 of the switchable light source.

In step 409, the emission of the light radiation is suppressed. For this purpose, at least one switching means 102, 102-1, 102-2 for switching switchable light source 101 is transferred into one of at least two possible switching states in each case.

The method ends in step 410.

Optionally, method 400 may also include step 411 between step 403 and step 404. In step 411, the predefinable behavior of the current variable representing the motor current is ascertained with the aid of control unit 109.

What is claimed is:

1. A LIDAR device for optically detecting a field of view, comprising:
    a control unit to emit at least one control signal;
    an electric motor, which has a motor current and which is controllably rotatable about a rotational axis using the at least one control signal, and on which a switchable light source emitting light radiation is situated;
    at least one switch to suppress the emission of the light radiation depending on a behavior of a current variable representing the motor current;
    at least one current sensor to detect the behavior of the current variable representing the motor current;
    a unit to compare the behavior of the current variable representing the motor current to a predefinable behavior, wherein the control unit is also configured to emit a suppression signal to the at least one switch of the switching light source to suppress the emission of the light radiation, depending on the comparison;
    wherein an instantaneous rotational speed of the electric motor is detected; and
    wherein the instantaneous rotational speed is compared to a threshold value, wherein the detection of the behavior of the current variable representing the motor current using the current sensor takes place based on the instantaneous rotational speed and the threshold value.

2. The LIDAR device as recited in claim 1, further comprising:
    at least one current sensor configured to detect the behavior of the current variable representing the motor current.

3. The LIDAR device as recited in claim 2, wherein the control unit is also configured to ascertain the predefinable behavior of the current variable representing the motor current.

4. The LIDAR device as recited in claim 2, wherein the at least one current sensor is a measuring shunt, the measuring shunt being a low-resistance measuring shunt.

5. The LIDAR device as recited in claim 2, wherein the at least one current sensor is a magnetic field sensor.

6. The LIDAR device as recited in claim 1, wherein the at least one switch is configured to switch a connection of the light source to an energy supply.

7. The LIDAR device as recited in claim 1, wherein the at least one switch is configured to switch a mechanical flap in a beam path of the light source.

8. The LIDAR device as recited in claim 1, further comprising:
    a unit configured to detect an instantaneous rotational speed of the electric motor; and
    a unit configured to compare the instantaneous rotational speed to a threshold value.

9. A vehicle, comprising:
    a LIDAR device to optically detecting a field of view, including:
        a control unit to emit at least one control signal;
        an electric motor, which has a motor current and which is controllably rotatable about a rotational axis using the at least one control signal, and on which a switchable light source emitting light radiation is situated; and
        at least one switch to suppress the emission of the light radiation depending on a behavior of a current variable representing the motor current;
        at least one current sensor to detect the behavior of the current variable representing the motor current;
        a unit to compare the behavior of the current variable representing the motor current to a predefinable behavior, wherein the control unit is also configured to emit a suppression signal to the at least one switch of the switching light source to suppress the emission of the light radiation, depending on the comparison;
        wherein an instantaneous rotational speed of the electric motor is detected; and
        wherein the instantaneous rotational speed is compared to a threshold value, wherein the detection of the behavior of the current variable representing the motor current using the current sensor takes place based on the instantaneous rotational speed and the threshold value.

10. A method for activating a LIDAR device, the method comprising:
    emitting at least one control signal using a control unit; and
    controlling an electric motor about a rotational axis using the at least one control signal, a switchable light source emitting light radiation being situated on the electric motor;
    suppressing the emission of the light radiation depending on a behavior of a current variable representing the motor current;
    detecting a behavior of the current variable representing the motor current;
    comparing the detected behavior of the current variable representing the motor current to a predefinable behavior; and
    emitting, to at least one switch of the switching light source, at least one suppression signal to suppress the emission of the light radiation, depending on the comparison;
    detecting an instantaneous rotational speed of the electric motor; and
    comparing the instantaneous rotational speed to a threshold value, wherein the detection of the behavior of the current variable representing the motor current using the current sensor takes place based on the instantaneous rotational speed the threshold value.

11. The method as recited in claim 10, wherein the behavior of the current variable representing the motor current is detected using a current sensor.

12. The method as recited in claim 11, further comprising:
    ascertaining the predefinable behavior of the current variable representing the motor current using the control unit.

13. The method as recited in claim 11, wherein the suppression of the emission of the light radiation occurs by transferring the at least one switch into one of at least two possible switching states.

14. The method as recited in claim 11, wherein the detection of the behavior of the current variable representing the motor current takes place when the instantaneous rotational speed exceeds the threshold value.

* * * * *